(12) United States Patent
Parker et al.

(10) Patent No.: US 6,218,464 B1
(45) Date of Patent: Apr. 17, 2001

(54) PREPARATION OF FLUORINATED POLYMERS

(75) Inventors: Hsing-Yeh Parker, Woodinville, WA (US); Willie Lau, Ambler; Erik S. Rosenlind, Rosemont, both of PA (US)

(73) Assignee: Rohm and Haas Company, Phila., PA (US)

( * ) Notice: Subject to any disclaimer, the term of this patent is extended or adjusted under 35 U.S.C. 154(b) by 0 days.

(21) Appl. No.: 09/323,448

(22) Filed: Jun. 1, 1999

Related U.S. Application Data

(62) Division of application No. 09/110,045, filed on Jul. 2, 1998, now Pat. No. 5,969,063.
(60) Provisional application No. 60/052,268, filed on Jul. 11, 1997.

(51) Int. Cl.[7] .............................. C08L 27/12; C08L 5/16; B32B 27/28; B32B 27/30
(52) U.S. Cl. ............................ 524/805; 524/48; 428/522
(58) Field of Search ....................... 524/805, 48

(56) References Cited

U.S. PATENT DOCUMENTS

| | | | |
|---|---|---|---|
| 3,403,122 | 9/1968 | Sherman et al. | 524/805 |
| 4,789,717 | 12/1988 | Giannetti et al. | 526/209 |
| 4,997,873 | 3/1991 | Süling et al. | 524/458 |
| 5,155,194 | 10/1992 | Kossmehl et al. | 526/238 |
| 5,214,452 | 5/1993 | Kossmehl et al. | 351/160 |
| 5,225,505 | 7/1993 | Wiegert | 526/245 |
| 5,376,441 | 12/1994 | Wu et al. | 428/304 |
| 5,521,266 | 5/1996 | Lau | 526/200 |
| 5,710,226 | 1/1998 | Lau | 526/200 |
| 5,798,406 * | 8/1998 | Feret et al. | 524/805 |
| 5,804,650 * | 9/1998 | Tsuda et al. | 524/805 |
| 5,883,175 * | 3/1999 | Kubo et al. | 524/805 |
| 5,942,572 * | 8/1999 | Chittofrati et al. | 524/805 |

FOREIGN PATENT DOCUMENTS

| | | |
|---|---|---|
| 58-168603 | 10/1983 | (JP) . |
| WO 94/12548 | 6/1994 | (WO) . |
| WO 94/22928 | 10/1994 | (WO) . |

\* cited by examiner

*Primary Examiner*—Tae H. Yoon
(74) *Attorney, Agent, or Firm*—S. Matthew Cairns

(57) ABSTRACT

Disclosed is a method for preparing fluorinated emulsion polymers that reduces or eliminates the need for fluorinated surfactants comprising the steps of:

a) providing a reaction mixture comprising water, surfactant, monomer mixture comprising at least one fluorinated monomer, at least one non-fluorinated monomer having high water solubility, and optionally at least one non-fluorinated monomer having low water solubility, macromolecular organic compound having a hydrophobic cavity; and b) polymerizing said monomer mixture.

10 Claims, No Drawings

PREPARATION OF FLUORINATED POLYMERS

This application is a division of Ser. No. 09/110,045, Jul. 2, 1998, U.S. Pat. No. 5,969,063, which claims benefit of provisional application 60/052,268, Jul. 11, 1997.

The present invention relates to the preparation of fluorinated polymers. In particular, the present invention relates to an improved preparation of fluorinated emulsion polymers.

Fluorinated polymers have many desirable properties such as superior weather resistance, high temperature resistance, water and oil repellency, low surface tension, chemical inertness, and low flammability. These properties have resulted in the use of fluorinated polymers as coating materials for textiles and various substrates in many industrial areas.

It is well known that is is very difficult to prepare emulsion polymers from perfluorinated monomers, particularly those containing long perfluorinated alkyl chains, such as fluoroalkyl groups having 4 to 20 carbon atoms, because these monomers are inherently water insoluble and have poor solubility in most organic hydrocarbon solvents and monomers. The insolubility of perfluorinated monomers limits their ability to be transported from monomer droplets to polymerizing particles. As a result, particle size distribution is broad, composition of a copolymer may not be uniform and high levels of gel form during the polymerization. Such gel formation is undesirable.

Various methods of polymerizing fluorinated monomers are known, such as by using an organic solvent having high solubility in both water and in the perfluorinated monomers. Such solvents aid the transport of monomer from the monomer droplets to the polymerizing particles. Other methods use relatively high levels of fluorinated surfactants to avoid gels or a combination of fluorinated surfactant and a compatibilizer containing a perfluorinated segment and a hydrocarbon segment. All of these methods have the disadvantage of introducing "foreign" components to the polymer latex. Solvents contribute to volatile organic compound ("VOC") content, and perfluorinated surfactants dilute the polymer content and end up in the polymer film where they can migrate and thereby alter the surface composition and properties of the film. Also, the use of large amounts of fluorinated surfactants adds to the cost of the polymer latex. However, reducing the amount of fluorinated surfactants leads to increased gel formation, which is undesirable.

U.S. Pat. No. 5,521,266 (Lau) discloses the emulsion polymerization of hydrophobic hydrocarbon monomers using cyclodextrin. The presence of cyclodextrin facilitates the transport of hydrophobic long alkyl chain monomers through the aqueous phase so that they can be homo- or copolymerized in a conventional emulsion polymerization process. There is no disclosure of the applicability of this method of emulsion polymerization to perfluorinated monomers.

The incompatability of fluorocarbons with hydrocarbons or water is well known, as evidenced by the use of fluorocarbon coatings for non-stick cooking surfaces. The cavity of cyclodextrin is a sugar ring having hydroxylated hydrocarbons. That cyclodextrins can be used to transport fluorinated monomers through the aqueous phase in emulsion polymerizations is unexpected and was not recognized in U.S. Pat. No. 5,521,266.

The present invention seeks to overcome the problems associated with known methods for preparing fluorinated emulsion polymers.

The present invention provides a method for preparing a fluorinated emulsion polymer comprising, as polymerized units, at least one fluorinated monomer and at least one non-fluorinated monomer having high water solubility, comprising the steps of:
  a) providing a reaction mixture comprising
    i) water,
    ii) surfactant,
    iii) monomer mixture comprising from 1 to 99 percent by weight of at least one fluorinated monomer, from 1 to 10 percent by weight of at least one non-fluorinated monomer having high water solubility, and from 0 to 98 percent by weight of at least one non-fluorinated monomer having low water solubility,
    iv) macromolecular organic compound having a hydrophobic cavity; and
  b) polymerizing said monomer mixture.

The present invention further provides a composition comprising a macromolecular organic compound and a fluorinated emulsion polymer comprising, as polymerized units, from 1 to 99 percent by weight of at least one fluorinated monomer, from 1 to 10 percent by weight of at least one non-fluorinated monomer having high water solubility, and from 0 to 98 percent by weight of at least one non-fluorinated monomer having low water solubility.

The present invention further provides an article comprising a coated substrate wherein the coating comprises the composition above.

The present invention provides a method for preparing fluorinated emulsion polymers that reduces or eliminates the need for a fluorinated surfactant. The present invention also provides a method for preparing fluorinated emulsion polymers that has reduced gel formation.

As used herein, the term "having low water solubility" means having water solubility at a temperature in the range of from 25 to 50° C. of no greater than 200 millimoles/liter. The term "having high water solubility" means having water solubility at a temperature in the range of from 25 to 50° C. of greater than 200 millimoles/liter. As used herein, the term "(meth)acrylate" refers to methacrylate and acrylate, the term "(meth)acrylic" refers to methacrylic and acrylic, and the term "(meth)acrylamide" refers to methacrylamide and acrylamide. The term "fluoroalkyl" means a partially fluorinated or perfluorinated ($C_1$–$C_{20}$)alkyl. "Alkyl" means linear or branched alkyl. All amounts are percent by weight unless otherwise noted, and all weight percent ranges are inclusive. As used herein, the following abbreviations are applied: "g"=grams; "AATCC"=American Association of Textile Chemists and Colorists; "BA"=butyl acrylate; "MMA"=methyl methacrylate; "MAA"=methacrylic acid; "2-EHA"=2-ethylhexyl acrylate; and "STY"=styrene.

Suitable fluorinated monomers include, but are not limited to: fluoroalkyl (meth)acrylate; fluoroalkylsulfoamidoethyl (meth)acrylate; fluoroalkylamidoethyl (meth)acrylate; fluoroalkyl (meth)acrylamide; fluoroalkylpropyl (meth)acrylate; fluoroalkylethyl poly(alkyleneoxide) (meth)acrylate; fluoroalkylsulfoethyl (meth)acrylate; fluoroalkylethyl vinyl ether; fluoroalkylethyl poly(ethyleneoxide) vinyl ether; pentafluoro styrene; fluoroalkyl styrene; fluorinated α-olefins; perfluorobutadiene; 1-fluoroalkylperfluorobutadiene; αH,αH,ωH,ωH-perfluoroalkanediol di(meth)acrylate; and β-substituted fluoroalkyl (meth)acrylate. Preferred fluorinated monomers have a fluoroalkyl group having form 4 to 20 carbon atoms. Particularly preferred is fluoro($C_6$–$C_{20}$)alkyl (meth)acrylate. Especially preferred fluorinated monomers are perfluorooctylethyl methacrylate and perfluorooctylethyl acrylate.

Suitable non-fluorinated monomers having low water solubility include, but are not limited to: α,β-ethylenically unsaturated monomers such as primary alkenes; styrene and alkylsubstituted styrene; α-methyl styrene; vinyltoluene; vinyl esters of ($C_4$–$C_{30}$)carboxylic acids, such as vinyl 2-ethylhexanoate and vinyl neodecanoate; vinyl chloride; vinylidene chloride; N-alkyl substituted (meth)acrylamide, such as octyl acrylamide and maleic acid amide; vinyl alkyl or aryl ethers with ($C_3$–$C_{30}$)alkyl groups, such as stearyl vinyl ether; ($C_1$–$C_{30}$)alkyl esters of (meth)acrylic acid, such as methyl methacrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate; unsaturated vinyl esters of (meth)acrylic acid, such as those derived from fatty acids and fatty alcohols; multifunctional monomers, such as pentaerythritol triacrylate; and monomers derived from cholesterol. These monomers may also contain functionality, such as, but not limited to: hydroxy, amido, aldehyde, ureido, and polyether.

Suitable non-fluorinated monomers having high water solubility include, but are not limited to: α,β-monoethylenically unsaturated monomers containing acid functionality, such as monomers containing at least one carboxylic acid group including acrylic acid, methacrylic acid, (meth)acryloxypropionic acid, itaconic acid, maleic acid, maleic anhydride, fumaric acid, crotonic acid, monoalkyl maleates, monoalkyl fumerates and monoalkyl itaconates; acid substituted (meth)acrylates, sulfoethyl methacrylate and phosphoethyl (meth)acrylate; acid substituted (meth)acrylamides, such as 2-acrylamido-2-methylpropylsulfonic acid and alkali metal and ammonium salts of such acid functional and acid-substituted monomers; basic substituted (meth)acrylates and (meth)acrylamides, such as amine substituted methacrylates including dimethylaminoethyl methacrylate, tertiary-butylaminoethyl methacrylate and dimethylaminopropyl methacrylamide; acrylonitrile; (meth)acrylamide and substituted (meth)acrylamide, such as diacetone acrylamide; (meth)acrolein; and methyl acrylate.

Suitable surfactants for use in the method of the present invention include all anionic, cationic and nonionic surfactants that can be used in emulsion polymerization. Such surfactants include non-fluorinated and fluorinated surfactants. Mixtures of surfactants may be used, including mixtures of non-fluorinated and fluorinated surfactants. Preferred surfactants are non-fluorinated anionic surfactant, non-fluorinated nonionic surfactant, fluorinated anionic surfactant, fluorinated nonionic surfactant, and mixtures thereof. It is further preferred that at least one fluorinated surfactant be used in the method of the present invention. Particularly preferred are mixtures of non-fluorinated anionic surfactants with fluorinated surfactants. Suitable non-fluorinated nonionic surfactants include, but are not limited to: ethoxylated octylphenols; ethoxylated nonylphenols; and ethoxylated fatty alcohols. Suitable non-fluorinated anionic surfactants include, but are not limited to: sodium lauryl sulfate; sodium dodecylbenzene sulfonate; sulfated and ethoxylated derivatives of nonylphenols, octylphenols, and fatty alcohols; and esterified sulfosuccinates. Preferred non-fluorinated anionic surfactants are sodium lauryl sulfate, salts of fatty acids and sulfated nonylphenoxypoly(ethyleneoxide)ethanol ammonium salt. Suitable non-fluorinated cationic surfactants include, but are not limited to: laurylpyridinium chlorides; cetyldimethyl amine acetate; and ($C_8$–$C_{18}$) alkyldimethylbenzyl-ammonium chlorides.

Suitable fluorinated surfactants include, but are not limited to: fluoro($C_6$–$C_{20}$)alkylcarboxylic acid salt; fluoro($C_4$–$C_{20}$)alkylsulfonic acid salt; fluoro($C_4$–$C_{20}$) alkylbenzene sulfonic acid salt; fluoro($C_4$–$C_{20}$)alkylpoly (ethyleneoxide)ethanol; 3-fluoro($C_1$–$C_6$)alkylethoxy-propionic acid salt; 3-fluoro($C_1$–$C_6$)alkylethylthio-propionic acid salt; 3-fluoro($C_1$–$C_6$)alkylethylamino-propionic acid salt; fluoro($C_4$–$C_{20}$)alkyl tri($C_1$–$C_6$)alkylammonium salt; fluoro($C_4$–$C_{20}$)alkylpoly (fluoroalkyleneoxide)sulfonic acid salt; fluoro($C_4$–$C_{20}$)alkylamido-alkylene tri($C_1$–$C_6$) alkylammonium salt; fluoro($C_4$–$C_{20}$) alkylsulfoamidoalkylene tri($C_1$–$C_6$)alkylammonium salt; and 3-fluoro($C_4$–$C_{20}$)alkylsulfoamidoethylamino-propionic acid salt. The counterions of the fluorinated anionic surfactants may be mono-, di-, or tri-valent metal cations. Nonionic and anionic fluorinated surfactants are preferred. More preferred fluorinated surfactants are perfluoroalkylethyl poly (ethyleneoxide)ethanol and 3-(perfluoroalkylethylthio) propionic acid lithium salt.

The total amount of surfactant may be from 0.1 to 10, and is preferably from 0.5 to 5 percent by weight, based on the total weight of monomer in the monomer emulsion. It is preferred that the total amount of fluorinated surfactant be from 0.01 to 5, preferably from 0.1 to 2 percent by weight based on the total weight of monomer in the monomer emulsion.

When the method of the present invention is used to prepare fluorinated emulsion polymers having a high percentage, such as 90 percent by weight or greater, of fluorinated monomer, it is preferred that only fluorinated surfactant be used. When the method of the present invention is used to prepare fluorinated emulsion polymers having less than about 90 percent by weight of fluorinated monomer, it is preferred that fluorinated surfactant be used in combination with non-fluorinated surfactant. It is further preferred that the non-fluorinated surfactant is anionic. When both fluorinated and non-fluorinated surfactants are used, it is preferred that the weight ratio of fluorinated to non-fluorinated surfactant is in the range of from 80:20 to 20:80.

The macromolecular organic compounds having a hydrophobic cavity useful in this invention are known, and are described, for example, in U.S. Pat. No. 5,521,266. Suitable macromolecular organic compounds include, but are not limited to: cyclodextrin and cyclodextrin derivatives; cyclic oligosaccharides having a hydrophobic cavity, such as cycloinulohexose, cycloinuloheptose, and cycloinuloctose; calyxarenes; and cavitands. The cyclodextrin and cyclodextrin derivatives useful in the method of the invention are limited only by their solubility under the particular polymerization conditions. Suitable cyclodextrins useful in this invention include, but are not limited to: α-cyclodextrin; β-cyclodextrin; and γ-cyclodextrin. Suitable cyclodextrin derivatives include, but are not limited to: methyl, triacetyl, hydroxypropyl, and hydroxyethyl derivatives of α-cyclodextrin; β-cyclodextrin; and γ-cyclodextrin. The preferred macromolecular organic compounds having a hydrophobic cavity are cyclodextrin and cyclodextrin derivatives. The preferred cyclodextrin derivative is methyl-β-cyclodextrin.

The water, surfactant, monomer mixture and macromolecular compound may be added to the reaction vessel in any order. The macromolecular organic compound having a hydrophobic cavity may be combined with the monomer mixture in any way. The macromolecular organic compound may be mixed with the fluorinated monomer and that mixture, along with the non-fluorinated monomer having high water solubility, surfactant and any optional monomer, can be added to the reaction vessel. In the alternative, the macromolecular organic compound may be mixed with the monomer mixture before the mixture is added to the reaction vessel. In another alternative, the macromolecular organic compound may be added to the reaction vessel before, during or after the monomer mixture has been added to the reaction vessel. It is preferred to add the macromolecular organic compound to the reaction vessel before the monomer mixture has been added.

Generally, the molar ratio of macromolecular organic compound to fluorinated monomer is in the range of from 5:1 to 1:5000, preferably in the range of from 1:1 to 1:1000, and most preferably from 1:1 to 1:500. It is generally only necessary to have molar ratios in the catalytic range, such as from 1:1 to 1:500.

The selection of the type and amounts of cross-linking agents, the control of pH, the rate of addition of the various components, the level of solids, and temperature of reaction for the emulsion polymerization are well known to those skilled in the art of emulsion polymerization.

A free radical initiator is used in the emulsion polymerizations. Suitable free radical initiators include, but are not limited to: hydrogen peroxide; tert-butyl hydroperoxide; sodium, potassium, lithium and ammonium persulfate. A reducing agent, such as a bisulfite, including an alkali metal metabisulfite, hydrosulfite, and hyposulfite; and sodium formaldehyde sulfoxylate or a reducing sugar, such as ascorbic acid, may be used in combination with the initiator to form a redox system. The amount of initiator may be generally from 0.01 to 2 percent by weight based on the total weight of monomer. When a redox system is used, the amount of reducing agent is generally in the range of from 0.01 to 2 percent by weight based on the total weight of monomer. Transition metal catalysts, such as iron salts, may also be used.

The polymerization temperature range is generally from 10 to 100° C. The temperature range is preferably from 75 to 90° C. in the case of persulfate systems. In the case of redox systems, the temperature range is preferably from 20 to 75° C.

The compositions of the invention optionally contain fluorinated surfactant. When fluorinated surfactant is present in the compositions, it is preferred that the fluorinated surfactant be nonionic or anionic. More preferred fluorinated surfactants are perfluoroalkylethyl poly(ethyleneoxide) ethanol and 3-(perfluoroalkylethylthio) propionic acid lithium salt.

The compositions prepared according to the method of the present invention are useful in high performance coatings, such as coatings for fibers and textiles, tile, brick, cement, concrete and as blend components in any formulation in place of wax or silicones. Adding fluorinated emulsion polymers to conventional formulations in place of wax or silicones provides increased water repellency to surfaces coated with the formulations. Fluorinated polymers can also be used to provide adhesive properties to very hydrophobic surfaces, such as polytetrafluoroethylene. The fluorinated polymers can be applied to the very hydrophobic surface as an adhesive, as a coating or mixed with a coating to be applied.

EXAMPLES

Wet gel level was determined by collecting the unfiltered material from both 60 and 325 mesh screens, compressing the material to expel excess water and weighing the compressed material on a scale.

The following surfactants and monomers were used in the Examples.

Rhodapex® CO-436

Sodium salt of sulfated polyethoxynonylphenol as a 59% aqueous solution

SLS

Sodium lauryl sulfate, used as a 28% aqueous solution

Zonyl® TM

Perfluoroalkylethyl methacrylate, $CH_2=C(CH_3)CO_2CH_2CH_2(CF_2)_nCF_3$, n=3–19

Zonyl® TAN

Perfluoroalkylethyl acrylate, $CH_2=CHCO_2CH_2CH_2(CF_2)_nCF_3$, n=5–17

Zonyl® FSN

Perfluoroalkylethyl poly(ethyleneoxide)ethanol, a nonionic fluorinated surfactant as a 40% solution in 50/50 water/isopropanol mixture.

Zonyl® FSA 3-(Perfluoroalkylethylthio) propionic acid lithium salt, an anionic fluorinated surfactant as a 25% solution in 50/50 water/isopropanol mixture

CD methyl-b-cyclodextrin

Zonyl® is a trademark of the DuPont Company. Rhodapex® is a trademark of Rhone-Poulenc Chimie.

Example 1

Monomer emulsion Preparation. A monomer mixture of 150 g butyl acrylate, 340 g methyl methacrylate, 500 g Zonyl TM and 10 g methacrylic acid and an aqueous mixture of 300 g deionized water, 6.7 g Rhodapex CO-436 and 10 g Zonyl FSN were heated to 60° C. in separate containers. Then the two warm mixtures were combined and homogenized to form a stable monomer emulsion. The stable emulsion was used either warm or after it cooled to room temperature.

Polymerization. A 3-liter round bottom flask was equipped with a condenser, a mechanical stirrer, a thermocouple, a monomer feed line, an initiator feed line and a nitrogen inlet. To the flask was added 400 g deionized water, 10 g Rhodapex CO-436 surfactant and 15 g Zonyl FSN surfactant. The contents of the flask were stirred and heated to 81° C. under nitrogen atmosphere. To the flask was added 10 g of a 50.3% aqueous CD solution followed by a 20 g deionized water. To the flask was added 35.5 g of the above described monomer emulsion and a buffer solution of 3.5 g sodium carbonate and 20 g deionized water. After 2 minutes stirring, an initiator solution of 2 g ammonium persulfate and 20 g deionized water was added to the flask. An exothermic reaction of about 2° C. was usually observed after the initiator solution addition. About 10 minutes after the peak temperature of the exothermic reaction, the rest of monomer emulsion and a second initiator solution of 1 g ammonium persulfate and 50 g deionized water were gradually added to the flask over a period of 60 minutes while the temperature was maintained at 81° C. The contents of the flask were maintained at 81° C. for an additional 15 minutes after the feeds were completed and then cooled to 50° C. During cooling, 1 g of a 0.1% ferrous sulfate solution was added to the flask at 70° C. After 2 minutes, 0.3 g of 70% t-butyl hydroperoxide solution mixed with 10 g deionized water and 0.15 g sodium sulfoxylate formaldehyde dissolved in 10 g deionized water were added separately. At 50° C, another 0.3 g of 70% t-butyl hydroperoxide solution mixed with 10 g deionized water and another 0.15 g sodium sulfoxylate formaldehyde dissolved in 10 g deionized water were added separately to the flask. The final emulsion was then neutralized to pH 8–9 with dropwise addition of ammonium hydroxide solution. The neutralized emulsion was then filtered through 60 and 325 mesh screen. The data for this polymer appear in Table 1, below.

Examples 2–6

The procedures described in Example 1 were followed, except that the amount of fluorinated surfactant and CD were varied and a different hydrocarbon surfactant was used in Example 5, as indicated in Table 1.

Comparative Examples C-1–C-4

The procedures described in Example 1 were followed, except that CD was not used and the amount of fluorinated surfactant was varied, as indicated in Table 1.

TABLE 1

| Example | Hydrocarbon | % wt | Zonyl FSN | CD % wt | Wet gel |
|---|---|---|---|---|---|
| 1 | Rhodapex CO-436 | 1 | 1 | 0.5 | 11 |
| 2 | Rhodapex CO-436 | 1 | 1 | 1 | 6 |
| 3 | Rhodapex CO-436 | 1 | 1 | 1 | 20 |
| 4 | Rhodapex CO-436 | 1 | 0.5 | 1 | 10 |
| 5 | SLS | 0.42 | 0.5 | 1 | 12 |
| 6 | Rhodapex CO-436 | 1 | 0 | 1 | 26 |
| C-1 | SLS | 0.42 | 0.5 | 0 | 490 |
| C-2 | Rhodapex CO-436 | 1 | 1 | 0 | 360 |
| C-3 | Rhodapex CO-436 | 1 | 1 | 0 | 250 |
| C-4 | Rhodapex CO-436 | 1 | 5 | 0 | 11 |

The above data show that the use of a macromolecular organic compound a hydrophobic cavity in the emulsion polymerization of fluorinated rs greatly reduces or eliminates the need for fluorinated surfactants, and the amount of gel formed during the polymerization.

Example 7

Monomer emulsion. A monomer emulsion was prepared by homogenizing a 60° C. organic mixture comprising 280 g 2-ethylhexylacrylate, 410 g styrene, 300 Zonyl TM and 10 g methacrylic acid, and a 60° C. aqueous mixture comprising 300 g deionized water, 10 g Rhodapex CO-436 and 15 g Zonyl FSN solution. The stable emulsion was used warm or after it cooled to room temperature.

Polymerization. Using the same setup as described in Example 1, 400 g deionized water, 15 g Rhodapex CO-436 surfactant solution and 22.5 g Zonyl FSN sulfactant solution were added to the flask. The contents of the flask were heated to 85° C. under nitrogen atmosphere followed by the addition of 20 g of a 50.3% aqueous CD solution and 20 g deionized water rinse. Then 35.5 g of the above described monomer emulsion and a buffer solution of 3.5 g sodium carbonate and 20 g deionized water were added to the flask. After 2 minutes stirring, an initiator solution of 2 g ammonium persulfate and 20 g deionized water was added to the flask. An exothermic reaction of about 2° C. was usually observed after the initiator solution addition. About 10 minutes after the peak temperature of the exothermic reaction, the rest of monomer emulsion and a second initiator solution of 1 g ammonium persulfate and 50 g deionized water were gradually added to the flask over a period of 60 minutes while the temperature was maintained at 81° C. The contents of the flask were maintained at 81° C. for an additional 15 minutes after the feeds were completed and then cooled to 50° C. During cooling, 1 g of a 0.1% ferrous sulfate solution was added to the flask at about 70 ° C. followed by 0.3 g of 70% t-butyl hydroperoxide solution mixed with 10 g deionized water and 0.15 g sodium sulfoxylate formaldehyde dissolved in 10 g deionized water were added separately. At 50° C., another 0.3 g of 70% t-butyl hydroperoxide solution mixed with 10 g deionized water and another 0.15 g sodium sulfoxylate formaldehyde dissolved in 10 g deionized water were added separately to the flask. The final emulsion was then neutralized to pH 8–9 with dropwise addition of ammonium hydroxide solution. The neutralized emulsion was then filtered through 60 and 325 mesh screen.

Example 8

The polymer was prepared using the procedures described in Example 7 except that the surfactant levels were reduced. The amounts of surfactant used in the monomer emulsion were 9.33 g Rhodapex CO-436 solution and 6 g Zonyl FSN solution. The amounts of surfactant added to the flask were 14 g Rhodapex CO-436 solution and 9 g Zonyl FSN solution.

Example 9

The polymer was prepared using the procedures described in Example 8 except that the fluorinated surfactant used was an anionic surfactant, Zonyl FSA.

Example 9A

The polymer was prepared using the procedures described in Example 7 except that no fluorinated surfactant was used.

Example 10

The polymer was prepared using the procedures described in Example 1 except that the monomer composition was 150 g butyl acrylate, 340 g styrene, 500 g Zonyl TM and 10 g methacrylic acid.

Example 11

The polymer was prepared using the procedures described in Example 1 except by a different operator.

Example 12

The polymer was prepared using the procedures described in Example 1 except that the monomer composition was 150 g butyl acrylate, 340 g methyl methacrylate, 500 g Zonyl TAN and 10 g methacrylic acid.

Example 13

The polymer was prepared using the procedures described in Example 1 except that the monomer composition was 90 g butyl acrylate, 200 g styrene, 700 g Zonyl TM and 10 g methacrylic acid.

Example 14

Monomer emulsion. A monomer emulsion was prepared by homogenizing a 60° C. organic mixture comprising 990 g Zonyl TM and 10 g methacrylic acid, and a 60° C. aqueous mixture comprising 300 g deionized water and 15 g Zonyl FSN solution.

Polymerization. Using the same setup as described in Example 1 400 g deionized water and 10 g Zonyl FSN surfactant solution were added to the flask. The contents of the flask were heated to 85° C. under nitrogen atmosphere followed by the addition of 20 g of a 50.3% aqueous methyl-b-cyclodextrin solution and 20 g deionized water rinse. Then 35.5 g of the above described monomer emulsion and a buffer solution of 3.5 g sodium carbonate and 20 g deionized water were added to the flask. After 2 minutes stirring, an initiator solution of 2 g ammonium persulfate and 20 g deionized water was added to the flask. An exothermic reaction of about 2° C. was usually observed after the initiator solution addition. About 10 minutes after the peak temperature of the exothermic reaction, the rest of monomer emulsion and a second initiator solution of 1 g ammonium persulfate and 50 g deionized water were gradually added to the flask over a period of 60 minutes while the temperature was maintained at 81° C. The contents of the flask were maintained at 81° C. for an additional 15 minutes after the feeds were completed and then cooled to 50° C. During cooling, 1 g of a 0.1% ferrous sulfate solution was added to the flask at about 70° C. followed by 0.3 g of 70% t-butyl hydroperoxide solution mixed with 10 g deionized water and 0.15 g sodium sulfoxylate formaldehyde dissolved in 10 g deionized water were added separately. At 50° C., another 0.3 g of 70% t-butyl hydroperoxide solution mixed with 10 g deionized water and another 0.15 g sodium sulfoxylate formaldehyde dissolved in 10 g deionized water were added separately to the flask. The final emulsion was then neutralized to pH 8–9 with dropwise addition of ammonium hydroxide solution. The neutralized emulsion was then filtered through 60 and 325 mesh screen.

Rohm and Haas Company) were evaluated for water repellency on nylon fabric using a standard test method.

Treated nylon samples were prepared as follows. A 10 percent by weight aqueous dispersion of the emulsion polymer was prepared. This binder formulation was padded on a Birch Brothers padder at pressure of 1.72 ×10$^5$ Pa (25 PSI) and a speed of 8.23 m/minute (27 ft/minute). The sample was dried in an oven at 150° C. for 4 minutes. The amount of binder add-on to the nylon samples was approximately 6 percent by weight.

The padded samples were evaluated using the AATCC Test Method 22–1980 Water Repellency Spray Test. A rating of "0" indicates complete wetting of whole upper and lower surfaces; a rating of "90" indicates slight random wetting of upper surface; and a rating of "100" indicates no wetting of upper surface. The spray test results are shown below.

| Sample | Spray Test Rating |
| --- | --- |
| Example 4 | 90 |
| Commercial binder | 0 |

These data indicate that the fluorinated emulsion polymers are useful in repelling water from fabric.

Example 16

Tile treated with a coating containing fluorinated emulsion polymers prepared according to the method of the

TABLE 2

| Example No. | Monomer Composition | | | | | | | Rhodapex CO-436 % wt | Fluorinated surfactant | | CD % wt | Wet gel g |
| --- | --- | --- | --- | --- | --- | --- | --- | --- | --- | --- | --- | --- |
| | BA | 2-EHA | MMA | Sty | Zonyl TM | Zonyl TAN | MAA | | Type | % wt | | |
| 7 | 0 | 28 | 0 | 41 | 30 | 0 | 1 | 1.5 | Zonyl FSN | 1.5 | 1 | 1.7 |
| 8 | 0 | 28 | 0 | 41 | 30 | 0 | 1 | 1.4 | Zonyl FSN | 0.6 | 1 | 2.5 |
| 9 | 0 | 28 | 0 | 41 | 30 | 0 | 1 | 1.4 | Zonyl FSA | 0.6 | 1 | 1.5 |
| 9A | 0 | 28 | 0 | 41 | 30 | 0 | 1 | 1.5 | none | 0 | 1 | 45 |
| 10 | 15 | 0 | 0 | 34 | 50 | 0 | 1 | 1 | Zonyl FSN | 1 | 1 | 20 |
| 11 | 15 | 0 | 34 | 0 | 50 | 0 | 1 | 1 | Zonyl FSN | 1 | 1 | 0.1 |
| 12 | 15 | 0 | 34 | 0 | 0 | 50 | 1 | 1 | Zonyl FSN | 1 | 1 | 0.1 |
| 13 | 9 | 0 | 0 | 20 | 70 | 0 | 1 | 0.6 | Zonyl FSN | 1.4 | 1 | 0.1 |
| 14 | 0 | 0 | 0 | 0 | 99 | 0 | 1 | 0 | Zonyl FSN | 1 | 1 | 0.6 |

It can be seen from the above data that a range of amounts of monomers and surfactants can be accommodated in the present invention. The above data also show that a fluorinated polymer can be prepared in the absence of a fluorinated surfactant without introducing organic solvents or compatabilizers into the polymer latex.

Example 15

Fabric treated with fluorinated emulsion polymers prepared according to the method of the present invention was tested for its resistance to wetting by water. The polymer of Example 4 and a commercially available non-fluorinated acrylic binder, Rhoplex® ST-954 binder (a trademark of the present invention was tested for water repellency. Six samples, labeled 16-1 to 16-6, and a comparative sample, labeled 16-C, were prepared according to the following table. Comparative sample 16-C was prepared from a commercially available, non-fluorinated acrylic binder, Acryloid® B-66 binder (a trademark of Rohm and Haas Company). One coat of each sample was brushed on Saltillo Mexican tile. Each tile was then tested for water penetration, water beading, water mark and gloss, and compared with an untreated tile. The results are shown in the following Table. Water penetration was the time, in hours, for water to penetrate the coating. Water beading is rated on a scale of 1 to 10, 1 being the worst and 10 being the best. Water mark and gloss were determined by visual inspection.

| Sample | 16-1 | 16-2 | 16-3 | 16-4 | 16-5 | 16-6 | Untreated control | 16-C |
|---|---|---|---|---|---|---|---|---|
| Ammonium perfluoroalkyl sulfonate (1%), g | 0.3 | 0.3 | 0.3 | 0.3 | 0.3 | 0.3 | — | |
| Silicone defoamer | 2 drops | 2 drops | 2 drops | 2 drops | 2 drops | 2 drops | — | |
| Diethylene glycol Ethylether, g | 1.5 | 1.1 | 1.5 | 1.1 | 1.5 | 1.1 | — | |
| Plasticizer, g | 0 | 0.2 | 0 | 0.2 | 0 | 0.2 | — | |
| Tributoxyethyl phosphate, g | 0.3 | 0.3 | 0.3 | 0.3 | 0.3 | 0.3 | — | |
| Fluoro Polymer (20%) Example No. | 13 | 13 | 11 | 11 | 12 | 12 | none | B-66 |
| Total weight, g | 20 | 20 | 20 | 20 | 20 | 20 | — | |
| Film Data: | | | | | | | | |
| Water penetration, hr. | >2 | 0.5 | >2 | >2 | >2 | 0.5 | 0 | <2 |
| Water beading | 10 | 10 | 10 | 10 | 10 | 10 | None | 1 |
| Water mark | None | None | None | None | None | None | Yes | Yes |
| Gloss: | High | High | High | High | High | High | Very low | Very low |

From the above data, it can be seen that the coatings containing fluorinated emulsion polymers offer higher gloss, greater resistance to water penetration, and enhanced water beading as compared to uncoated tile or tile coated with a non-fluorinated polymer coating.

What is claimed is:

1. A composition comprising a macromolecular organic compound and a fluorinated emulsion polymer comprising, as polymerized units, from 1 to 99 percent by weight of at least one fluorinated monomer, from 1 to 10 percent by weight of at least one non-fluorinated monomer having high water solubility, and from 0 to 98 percent by weight of at least one non-fluorinated monomer having low water solubility, wherein said macromolecular organic compound is selected from the group consisting of cyclodextrin; methyl, triacetyl, hydroxypropyl, and hydroxyethyl derivatives of cyclodextrin; cycloinulohexose; cycloinuloheptose; cycloinuloctose; calyxarene and cavitand.

2. An article comprising a coated substrate wherein the coating comprises the composition of claim 1.

3. The composition of claim 1 wherein said fluorinated monomer is selected from the group consisting of fluoroalkyl (meth)acrylate; fluoroalkylsulfoamidoethyl (meth)acrylate; fluoroalkylamidoethyl (meth)acrylate; fluoroalkyl (meth)acrylamide; fluoroalkylpropyl (meth)acrylate; fluoroalkylethyl poly(alkyleneoxide) (meth)acrylate; fluoroalkylsulfoethyl (meth)acrylate; fluoroalkylethyl vinyl ether; fluoroalkylethyl poly(ethyleneoxide) vinyl ether; pentafluoro styrene; fluoroalkyl styrene; fluorinated α-olefins; perfluorobutadiene; 1-fluoroalkylperfluorobutadiene; αH,αH,ωH, ωH-perfluoroalkanediol di(meth)acrylate and β-substituted fluoroalkyl (meth)acrylate.

4. The composition of claim 3 wherein said fluorinated monomer is selected from perfluorooctylethyl methacrylate and perfluorooctylethyl acrylate.

5. The composition of claim 1 wherein said non-fluorinated monomer having high water solubility is selected from the group consisting of α,β-monoethylenically unsaturated monomers containing acid functionality; acid substituted (meth)acrylates and sulfoethyl methacrylate; acid substituted (meth)acrylamides; basic substituted (meth)acrylates and (meth)acrylamides; acrylonitrile; (meth)acrylamide and diacetone acrylamide; (meth)acrolein; and methyl acrylate.

6. The composition of claim 1 wherein said non-fluorinated monomer having low water solubility is selected from the group consisting of α,β-ethylenically unsaturated monomers; styrene and alkylsubstituted styrene; α-methyl styrene; vinyltoluene; vinyl esters of $(C_4-C_{30})$carboxylic acids; vinyl chloride; vinylidene chloride; N-alkyl substituted (meth)acrylamide; vinyl alkyl or aryl ethers with $(C_3-C_{30})$alkyl groups; $(C_1-C_{30})$alkyl esters of (meth)acrylic acid; unsaturated vinyl esters of (meth)acrylic acid; multi-functional monomers and monomers derived from cholesterol.

7. The composition of claim 1 wherein the molar ratio of macromolecular organic compound to fluorinated monomer is from 5:1 to 1:5000.

8. The composition of claim 1 further comprising a surfactant selected from the group consisting of non-fluorinated anionic surfactant, non-fluorinated nonionic surfactant, fluorinated anionic surfactant, fluorinated nonionic surfactant, and mixtures thereof.

9. A coating composition comprising the composition of claim 1.

10. The article of claim 2 wherein the substrate is selected from textile, tile, brick, cement and concrete.

* * * * *